June 21, 1927.  1,633,224

C. E. OGDEN

STORAGE BATTERY

Filed Dec. 31, 1926

Inventor
Clarence E. Ogden,
By Arthur H. Ewald,
Attorney

Patented June 21, 1927.

1,633,224

UNITED STATES PATENT OFFICE.

CLARENCE E. OGDEN, OF CINCINNATI, OHIO, ASSIGNOR TO THE KODEL RADIO CORPORATION, A CORPORATION OF OHIO.

STORAGE BATTERY.

Application filed December 31, 1926. Serial No. 158,337.

My invention relates to storage batteries of the multiple cell type in which it is necessary to renew the electrolyte from time to time by the addition of distilled water or other liquid.

In storage batteries of the multiple cell type as at present constructed, each cell is provided with an opening through which distilled water or other liquid may be added for the purpose of renewing the electrolyte. This construction, of course, requires that each of the cells of the battery be treated individually and results not only in increased labor but also generally in the electrolyte in the various cells being maintained at unequal levels. It is for the purpose of overcoming these difficulties by the provision of multiple cell battery in which all of the cells may be renewed through a single opening, thus automatically maintaining a uniform level of the electrolyte in each cell and obviating a large portion of the labor, that the present invention is principally designed.

Other objects of the invention will appear from the following detailed description thereof.

Figure 1:
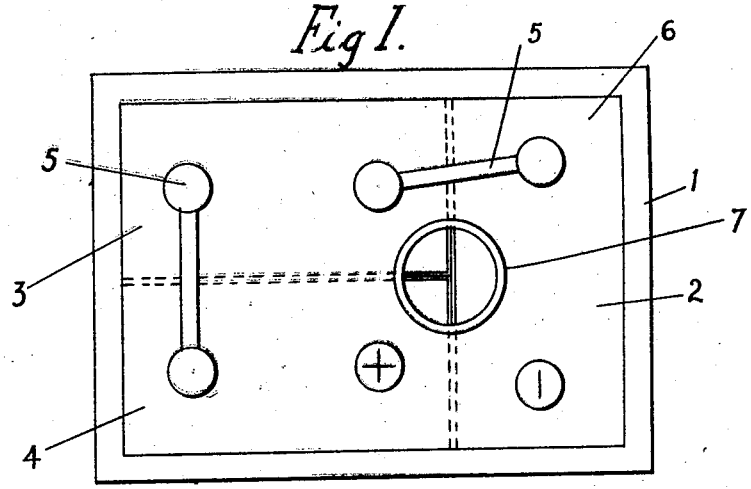
Figure 1 is a top view of a three-cell storage battery constructed in accordance with this invention.

The numeral 1 indicates a case which may be of wood, rubber or other suitable material, said case being adapted to contain all of the cells 2, 3 and 4 of the storage battery as illustrated in Figure 1. In the three-cell type of battery the cell 2 is placed transversely at one end of the case or box, and cells 3 and 4 longitudinally in the remaining portion of the case, as clearly shown in Figure 1 of the drawings. The cells are interconnected by the usual connectors 5 between their respective terminals. The cover 6 of the case extends over all of the cells, and said cover is provided with a filling opening 7 adapted to be closed by the usual vented cap 8. The opening 7 is so located as to be above the adjacent portions of the several cells as shown in Figure 1 of the drawings, so that when liquid is poured in through the opening 7 it enters all three of the cells simultaneously.

Figure 2:
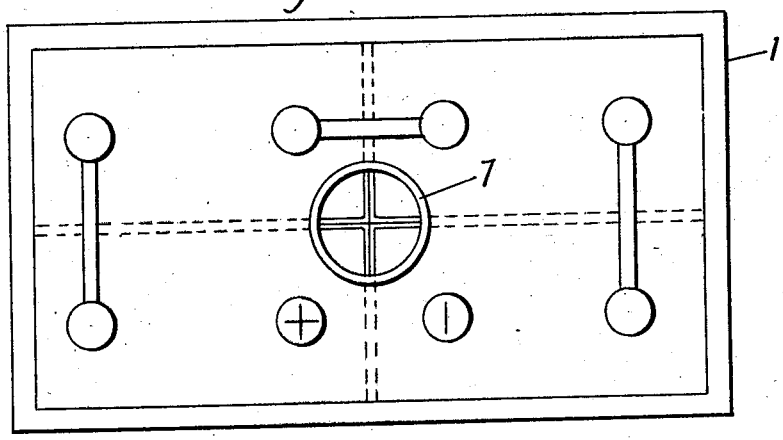
Figure 2 is a similar view of a four-cell storage battery.

In Figure 2 I have shown a battery of similar construction having four cells, in which arrangement the several cells are disposed in longitudinal relation in the box in two rows, and the filling opening 7 is located above the common center of the cells so as to extend over a corner of each cell.

Figure 3:
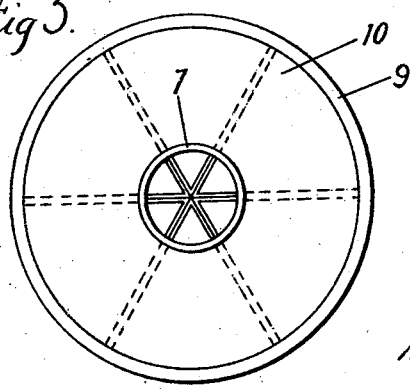
Figure 3 is a similar view of a six-cell storage battery constructed in accordance with this invention.
Figure 4:
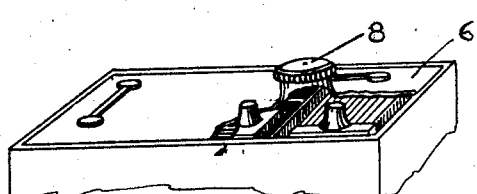
Figure 4 is a perspective of the upper portion of the three-cell battery.

In Figure 3 I have illustrated a storage battery having six cells. In this construction it is preferable to provide a case or box 9 of cylindrical shape, the cells 10 being sectors of the cylinder. The cover is provided with filling opening 7 located at the center and of a size to extend over the adjacent angular portions of the cells, as clearly shown in Figure 3.

Having thus fully described my invention, what I claim as new and desire to secure by Letters Patent is:

1. In a storage battery, a case, a plurality of cells disposed in said case with portions of each of the cells converging at a common center, a cover for said case, said cover being provided with a filling opening above and around said common center.

2. In a storage battery, a case, a cell located transversely at one end of said case, two cells located longitudinally in the remaining portion of said case contiguous to said first cell, and a filling opening in the upper portion of said case extended over contiguous portions of all of said cells.

CLARENCE E. OGDEN.